(12) United States Patent
Li et al.

(10) Patent No.: US 12,432,747 B2
(45) Date of Patent: Sep. 30, 2025

(54) FREQUENCY DOMAIN RESOURCE ASSIGNMENT METHOD AND DEVICE

(71) Applicant: VIVO MOBILE COMMUNICATION CO., LTD., Guangdong (CN)

(72) Inventors: Gen Li, Dongguan (CN); Zichao Ji, Dongguan (CN); Siqi Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 416 days.

(21) Appl. No.: 17/982,848

(22) Filed: Nov. 8, 2022

(65) Prior Publication Data

US 2023/0066709 A1   Mar. 2, 2023

Related U.S. Application Data

(63) Continuation of application No. PCT/CN2021/091862, filed on May 6, 2021.

(30) Foreign Application Priority Data

May 8, 2020 (CN) .......................... 202010383540.8

(51) Int. Cl.
*H04W 72/23* (2023.01)
(52) U.S. Cl.
CPC .................................. *H04W 72/23* (2023.01)
(58) Field of Classification Search
CPC ..................................................... H04W 72/23
See application file for complete search history.

(56) References Cited

U.S. PATENT DOCUMENTS

| | | | |
|---|---|---|---|
| 9,014,072 | B2 | 4/2015 | Cai et al. |
| 9,155,081 | B2 | 10/2015 | Seo et al. |
| 10,284,404 | B2 | 5/2019 | Park et al. |
| 10,462,772 | B2 | 10/2019 | Feng et al. |
| 11,818,695 | B2 | 11/2023 | Wang et al. |
| 2013/0034073 | A1 | 2/2013 | Aiba et al. |
| 2014/0086184 | A1 | 3/2014 | Guan et al. |

(Continued)

FOREIGN PATENT DOCUMENTS

| | | |
|---|---|---|
| CN | 102378387 A | 3/2012 |
| CN | 102625456 A | 8/2012 |

(Continued)

OTHER PUBLICATIONS

International Search Report and Written Opinion of the International Searching Authority regarding International Patent Application No. PCT/CN2021/091862, dated Aug. 4, 2021. Translation provided by Bohui Intellectual Property.
First Office Action regarding Japanese Patent Application No. 2022-567863, dated Oct. 5, 2023.
First Office Action regarding Chinese Patent Application No. 202010383540.8, dated Feb. 21, 2024. Translation provided by Bohui Intellectual Property.

(Continued)

*Primary Examiner* — Ronald B Abelson
(74) *Attorney, Agent, or Firm* — Harness, Dickey & Pierce, P.L.C.

(57) ABSTRACT

A frequency domain resource assignment method includes: receiving downlink control information for scheduling a plurality of carriers, cells, or bandwidth parts; and determining, based on a frequency domain resource assignment field in the downlink control information, frequency domain resources of the terminal on at least part of the plurality of carriers, cells, or bandwidth parts.

18 Claims, 3 Drawing Sheets

(56) References Cited

U.S. PATENT DOCUMENTS

| | | | |
|---|---|---|---|
| 2019/0357300 A1* | 11/2019 | Zhou | H04L 5/0094 |
| 2020/0068610 A1 | 2/2020 | Li et al. | |
| 2020/0187084 A1 | 6/2020 | Fujishiro et al. | |
| 2021/0136806 A1* | 5/2021 | Xiong | H04W 72/23 |
| 2021/0307044 A1 | 9/2021 | Bae et al. | |
| 2022/0078763 A1 | 3/2022 | Cai et al. | |

FOREIGN PATENT DOCUMENTS

| | | |
|---|---|---|
| CN | 106656444 A | 5/2017 |
| CN | 108934075 A | 12/2018 |
| CN | 110324897 A | 10/2019 |
| CN | 110351845 A | 10/2019 |
| CN | 110475356 A | 11/2019 |
| CN | 110769508 A | 2/2020 |
| CN | 110912663 A | 3/2020 |
| CN | 110999404 A | 4/2020 |
| EP | 3376699 A1 | 9/2018 |
| JP | 2017538318 A | 12/2017 |
| WO | WO-2019193153 A1 | 10/2019 |
| WO | WO-2020027587 A1 | 2/2020 |

OTHER PUBLICATIONS

Huawei, HiSilicon, "NR CA enhancements and DSS," Document RP-192797, 3GPP TSG RAN Meeting #86, Dec. 9-12, 2019.

Notice of Allowance regarding Japanese Patent Application No. 2022-567863, dated Apr. 1, 2024. Translation provided by Bohui Intellectual Property.

Supplementary European Search Report regarding European Patent Application No. 21800049.5-1215, dated Jul. 27, 2023.

Second Office Action regarding Chinese Patent Application No. 202010383540.8, dated Jul. 2, 2024. Translation provided by Bohui Intellectual Property.

Notice of Allowance regarding Chinese Patent Application No. 202010383540.8, dated Sep. 26, 2024. Translation provided by Bohui Intellectual Property.

"Discussion on physical UL channel design in unlicensed spectrum," vivo, 3GPP TSG RAN WG1 #99, R1-1912011, dated Nov. 18, 2019.

"UL signals and channels for NR-U," Sharp, 3GPP TSG RAN WG1#98b Meeting, R1-1910928, dated Oct. 14, 2019.

* cited by examiner

FREQUENCY DOMAIN RESOURCE ASSIGNMENT METHOD AND DEVICE

CROSS-REFERENCE TO RELATED APPLICATIONS

This application is a Bypass Continuation Application of PCT/CN2021/091862 filed on May 6, 2021, which claims priority to Chinese Patent Application No. 202010383540.8 filed on May 8, 2020, which are incorporated herein by reference in their entirety.

TECHNICAL FIELD

Embodiments of the present disclosure relate to the field of communication technologies, and in particular, to a frequency domain resource assignment method and a device.

BACKGROUND

Currently, scheduling a plurality of carriers with one piece of downlink control information (DCI) is not supported in the New Radio (NR) system. However, in a dynamic spectrum sharing (DSS) scenario, the overhead of a physical downlink control channel (PDCCH) can be effectively reduced by supporting one piece of DCI in scheduling a plurality of carriers.

However, in a scenario where one piece of DCI is used to schedule a plurality of carriers, cells, or bandwidth parts (BWP), the quantity of bits required for frequency domain resource assignment is large. If the plurality of carriers, cells, or BWPs separately use frequency domain resource assignment fields thereof, the frequency domain resource assignment field may have a large overhead, which may finally cause a size of the DCI to be too large.

SUMMARY

An objective of embodiments of the present disclosure is to provide a frequency domain resource assignment method and a device.

According to a first aspect, an embodiment of the present disclosure provides a frequency domain resource assignment method, performed by a terminal and including:
  receiving downlink control information for scheduling a plurality of carriers, cells, or bandwidth parts; and
  determining, based on a frequency domain resource assignment field in the downlink control information, frequency domain resources of the terminal on at least part of the plurality of carriers, cells, or bandwidth parts.

According to a second aspect, an embodiment of the present disclosure provides a frequency domain resource assignment method, performed by a network device and including:
  sending downlink control information for scheduling a plurality of carriers, cells, or bandwidth parts, where
  a frequency domain resource assignment field in the downlink control information is used to obtain frequency domain resources of the terminal on at least part of the plurality of carriers, cells, or bandwidth parts.

According to a third aspect, an embodiment of the present disclosure provides a terminal, including:
  a first receiving module, configured to receive downlink control information for scheduling a plurality of carriers, cells, or bandwidth parts; and
  a determining module, configured to determine, based on a frequency domain resource assignment field in the downlink control information, frequency domain resources of the terminal on at least part of the plurality of carriers, cells, or bandwidth parts.

According to a fourth aspect, an embodiment of the present disclosure provides a network device, including:
  a first sending module, configured to send downlink control information for scheduling a plurality of carriers, cells, or bandwidth parts, where
  a frequency domain resource assignment field in the downlink control information is used to obtain frequency domain resources of the terminal on at least part of the plurality of carriers, cells, or bandwidth parts.

According to a fifth aspect, an embodiment of the present disclosure provides a communications device, including a processor, a memory, and a program stored in the memory and executable on the processor, where when the program is executed by the processor, steps of the method according to the first aspect or the second aspect are implemented.

According to a sixth aspect, an embodiment of the present disclosure provides a non-transitory readable storage medium, where the non-transitory readable storage medium stores a program, and when the program is executed by a processor, steps of the method according to the first aspect or the second aspect are implemented.

According to a seventh aspect, an embodiment of the present disclosure provides a chip, where the chip includes a processor and a communications interface, the communications interface is coupled to the processor, and the processor is configured to run a program or an instruction to implement steps of the method according to the first aspect and the second aspect.

BRIEF DESCRIPTION OF DRAWINGS

It becomes clear for those of ordinary skill in the art to learn various other advantages and benefits by reading detailed description of the following implementations. The accompanying drawings are merely used to show implementations, and are not considered as limitations to the present disclosure. In addition, in all the accompanying drawings, a same reference symbol is used to represent a same part. In the accompanying drawings.

DESCRIPTION OF EMBODIMENTS

Figure 1:
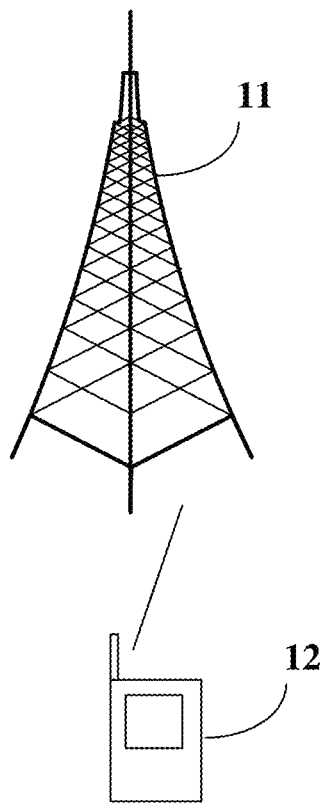
FIG. 1 is a schematic architectural diagram of a wireless communications system according to an embodiment of the present disclosure.

For ease of understanding embodiments of the present disclosure, technical points are described below.

(1) Downlink Frequency Domain Resource Assignment in the NR.

There are two types of resource blocks (RB) in the NR, including a physical resource block (PRB) and a virtual resource block (VRB). For a frequency domain resource of a downlink physical downlink shared channel (PDSCH) with a bandwidth size of $N_{BWP}^{size}$, there are a total of $N_{BWP}^{size}$ VRBs and PRBs, numbered from 0 to $N_{BWP}^{size}-1$. In resource assignment of the PDSCH, there are two mapping modes from the VRB to the PRB: non-interleaved and interleaved.

The frequency domain resource assignment of the PDSCH in the NR is indicated by a frequency domain resource assignment (FDRA) field of the DCI, that is, an index value of the VRB of the PDSCH in the downlink BWP.

Two types of resource assignment are supported: the Type 0 (discontinuous frequency domain resource assignment) and the Type 1 (continuous frequency domain resource assignment).

As for a frequency domain resource assignment type where DCI 1_0 only supports the Type 1, there is a 1 bit to indicate a mapping mode from the VRB to the PRB.

As for a frequency domain resource assignment type where DCI 1_1 may support the Type 0 or the Type 1, a high-layer configuration may be the Type 0 or the Type 1, or the high-layer configuration may be a dynamic switch mode, and the resource assignment type is indicated by a height of 1 bit of the FDRA field in DCI 1_1. If the high-layer configuration does not support the interleaved mode of mapping from the VRB to the PRB, or the high-layer configuration only supports the resource assignment type of the Type 0, DCI 1_1 is non-interleaved VRB-to-PRB mapping, and there is no VRB-to-PRB mapping indication bit. Otherwise, the non-interleaved or interleaved mode is indicated by using the VRB-to-PRB mapping bit.

For the resource assignment methods of the Type 0 and the Type 1, see the uplink and downlink frequency domain resource assignment schemes in the NR below.

(2) Introduction of Two Types of Resource Assignment: The Type 0 and the Type 1.

Type 0.

Resource blocks in a target uplink/downlink BWP of resource assignment are divided into a plurality of resource block groups (RBG), each RBG is corresponding to a set including at most P consecutive VRBs, P is configured based on high-layer parameters (indicating which column in Table 1 is used, Configuration 1 or Configuration 2), and Carrier Bandwidth Part Size indicates a quantity of resource blocks included in the target uplink/downlink BWP.

TABLE 1

Nominal RBG size P

| Carrier Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

The FDRA field of DCI Format 0_1/1_1 uses a bitmap to indicate whether each RBG in the target uplink BWP is assigned to the terminal. Each bit in the Bitmap is in a one-to-one correspondence with each RBG in the target uplink/downlink BWP. When a bit in the Bitmap is set to 1, it indicates that the corresponding RBG is assigned to the terminal, that is, all resource blocks included in the RBG are assigned to the terminal.

DCI Format 0_0/1_0 does not support the uplink resource assignment type 0.

Type 1.

If a start VRB number in the VRB set is $RB_{start}$ (a local number in the target uplink BWP), and the quantity of consecutively assigned VRBs is $L_{RBs}$, the resource indication value (RIV) may be calculated based on the following formula:

if $(L_{RBs}-1) \le \lfloor N_{BWP}^{size}/2 \rfloor$, then $RIV=N_{BWP}^{size}(L_{RBs}-1)+RB_{start}$ otherwise $RIV=N_{BWP}^{size}(N_{BWP}^{size}-L_{RBs}+1)+(N_{BWP}^{size}-1-RB_{start})$ $N_{BWP}^{size}$ is the quantity of VRBs included in the target uplink BWP, and $L_{RBs} \ge 1$ and cannot exceed $N_{BWP}^{size}-RB_{start}$.

The RIV is indicated in the "FDRA" field of DCI Format 0_0/0_1/1_0/1_1, so as to indicate the assigned VRB set to the terminal.

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

The term "comprise/include" and any other variants in the description and the claims of this application mean to cover the non-exclusive inclusion, for example, a process, method, system, product, or device that includes a list of steps or units and is not necessarily limited to those steps or units, but may include other steps or units not expressly listed or inherent to such a process, method, product, or device. In addition, "and/or" used in the description and the claims means at least one of the connected objects. For example, A and/or B represents the following three cases: only A exists, only B exists, and both A and B exist.

In the embodiments of the present disclosure, the word such as "example" or "for example" is used to represent giving an example, an illustration, or a description. Any embodiment or design solution described as "exemplary" or "for example" in the embodiments of the present disclosure should not be construed as being more preferred or advantageous than other embodiments or design solutions. To be precise, the use of the term such as "exemplary" or "for example" is intended to present a related concept in a specific manner.

The technology described herein is not limited to a long term evolution (LTE)/LTE-Advanced (LTE-A) system, and can also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems.

The terms "system" and "network" are often interchangeably used. A CDMA system may implement a radio technology such as CDMA 2000 or Universal Terrestrial Radio Access (UTRA). The UTRA includes wideband CDMA (WCDMA) and other CDMA variants. The TDMA system may implement a radio technology such as Global System for Mobile Communication (GSM). The OFDMA system can implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. The UTRA and E-UTRA are parts of a universal mobile telecommunications system (UMTS). LTE and more advanced LTE (such as LTE-A) are new UMTS versions that use E-UTRA. UTRA, E-UTRA, UMTS, LTE, LTE-A, and GSM are described in documents from an organization named "3rd Generation Partnership Project" (3GPP). CDMA2000 and UMB are described in the documents of the organization named the "3rd Generation Partnership Project 2" (3GPP2). The technologies described in this specification may be used in the systems and radio technologies mentioned above, and may also be used in another system and radio technology.

The frequency domain resource in this specification may also be referred to as a frequency domain assignment unit or a frequency domain assignment basic unit. The frequency domain resource may be a resource block (RB), a sub-channel, or an interlace, and certainly is not limited thereto. It can be understood that, in some of the following embodiments, the RB is used as an example for introduction, and implementations of the sub-channel and the interlace are similar to this. Details are not described herein again.

The embodiments of the present disclosure are described below in conjunction with the accompanying drawings. A frequency domain resource assignment method and a device according to the embodiments of the present disclosure may be applied to a wireless communications system. Referring to FIG. 1, FIG. 1 is a schematic architectural diagram of a wireless communications system according to an embodiment of the present disclosure. As shown in FIG. 1, the wireless communications system may include: a network device 11 and a terminal 12. The terminal 12 may be denoted as a UE12, and the terminal 12 may communicate with the network device 11 (to transmit signaling or transmit data). In actual application, a connection between the foregoing devices may be a wireless connection. To conveniently and intuitively represent a connection relationship between the devices, a solid line is used for illustration in FIG. 1.

The network device 11 provided in this embodiment of the present disclosure may be a base station, and the base station may be a generally used base station, or may be an evolved node base station (eNB), or may further be a device such as a network device (for example, a next generation node base station (next generation node base station, gNB) or a transmission and reception point (TRP)) in a 5G system.

The terminal 12 provided in this embodiment of the present disclosure may be a mobile phone, a tablet computer, a notebook computer, an ultra-mobile personal computer (UMPC), a netbook, a personal digital assistant (PDA), a mobile Internet device (MID), a wearable device, an in-vehicle device, or the like.

Figure 2:
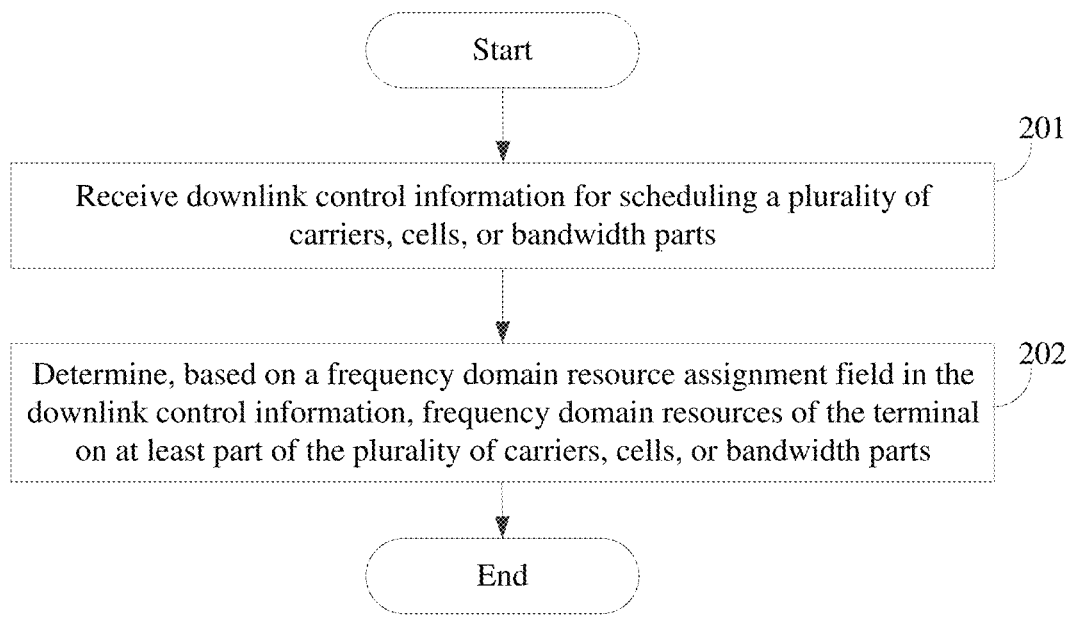
FIG. 2 is a flowchart 1 of a frequency domain resource assignment method according to an embodiment of the present disclosure.

Referring to FIG. 2, an embodiment of the present disclosure provides a frequency domain resource assignment method. The method is performed by a terminal and includes: step 201 and step 202.

Step 201: receive downlink control information for scheduling a plurality of carriers, cells, or bandwidth parts.

The foregoing bandwidth part (BWP) may be understood as a combination of a plurality of consecutive resource blocks (RB) in one carrier.

The foregoing cell may include a plurality of BWPs.

Step 202: determine, based on a frequency domain resource assignment field in the downlink control information, frequency domain resources of the terminal on at least part of the plurality of carriers, cells, or bandwidth parts (namely, the Type 1 frequency domain resource).

It can be understood that the frequency domain resource assignment field may indicate the Type 1 frequency domain resource assigned to each of the plurality of carriers, cells, or bandwidth parts, or the frequency domain resource assignment field may also indicate the Type 1 frequency domain resource assigned to part of the plurality of carriers, cells, or bandwidth parts. In other words, the frequency domain resource assignment field may indicate that resource assignment on any carrier, cell, or bandwidth part is invalid assignment.

In this embodiment of the present disclosure, the size of the frequency domain resource assignment field in the downlink control information is smaller than the size of the frequency domain resource assignment field required for all scheduled carriers, cells, or bandwidth parts to assign frequency domain resources. In other words, in a scenario where one piece of downlink control information is used to schedule a plurality of carriers, cells, or bandwidth parts, the assignment overhead of the Type 1 frequency domain resource may be reduced.

In this embodiment of the present disclosure, Method 1 and Method 2 may be used to reduce the assignment overhead of the Type 1 frequency domain resource.

Method 1: reduce the assignment overhead of the Type 1 frequency domain resource through joint coding of a plurality of carriers, cells, or bandwidth parts.

In some implementations, the frequency domain resource assignment field may be determined based on joint coding of frequency domain resources assigned to the plurality of carriers, cells, or bandwidth parts. In other words, the effective frequency domain resource assignment of the plurality of carriers, cells, or bandwidth parts is jointly encoded to determine the frequency domain resource assignment field.

The joint coding described above refers to joint coding of a start position and a length of a frequency domain resource to form an RIV value, or joint coding of a start position and an end position of a frequency domain resource to form an MV value. The method of joint coding is certainly not limited to this.

Optionally, one information bit (or referred to as a code point) in the frequency domain resource assignment field indicates the type 1 frequency domain resources assigned to at least two scheduled carriers, cells, or bandwidth parts, that is, each code point in the frequency domain resource assignment field may be corresponding to a combination of resource assignment of a plurality of carriers, cells, or BWPs.

Optionally, a size of the frequency domain resource assignment field is related to $N_i$ and T, where T represents a quantity of scheduled carriers, cells, or bandwidth parts, and T is a positive integer. For example, T=2, indicating that the quantity of carriers, cells, or bandwidth parts is 2, that is, one piece of DCI is used to schedule 2 carriers, cells, or bandwidth parts;

$N_i$ represents a quantity of frequency domain resources (for example, the RBs) of an i-th scheduled carrier, cell, or bandwidth part, where i=0, 1, . . . , T−1.

Alternatively, $N_i = K_i - L_i + 1$, $K_i$ is a quantity of frequency domain resources of an i-th scheduled carrier, cell, or bandwidth part, and $L_i$ is a minimum or maximum quantity of frequency domain resources that can be assigned (or scheduled) to the i-th scheduled carrier, cell, or bandwidth part.

For example, a size of the frequency domain resource assignment field may be:

$$\left\lceil \log_2\left(\frac{\prod_{i=0}^{T-1}\{N_i(N_i+1)\}}{2^T}\right)\right\rceil$$

$$\text{or } \left\lceil \log_2\left(\frac{\prod_{i=0}^{T-1}\{N_i(N_i+1)+1\}}{2^T}\right)\right\rceil,$$

where $\Pi$ represents a quadrature operation or a direct product operation.

It should be noted that, the minimum or maximum quantity of frequency domain resources that can be assigned (or scheduled) to the carrier, cell, or bandwidth part may be agreed in a protocol or configured by a network side, and certainly is not limited thereto.

In some implementations, the information bit indicates any one of following:

(1) a start frequency domain resource (for example, a start RB index) and a quantity (for example, a quantity of RBs) of frequency domain resources (for example, the RBs) assigned to the scheduled at least two carriers, cells, or bandwidth parts;

(2) a start frequency domain resource (for example, a start RB index) and an end frequency domain resource (for example, an end RB index) of frequency domain resources (for example, the RBs) assigned to the scheduled at least two carriers, cells, or bandwidth parts;

(3) a start frequency domain resource (for example, a start RB index) of frequency domain resources (for example, the RBs) assigned to the scheduled at least two carriers, cells, or bandwidth parts and a quantity of frequency domain resources (for example, a quantity of RBs) actually assigned to the scheduled at least two carriers, cells, or bandwidth parts;

(4) a start frequency domain resource (for example, a start RB index) of frequency domain resources (for example, the RBs) assigned to the scheduled at least two carriers, cells, or bandwidth parts, and a difference between a quantity of frequency domain resources (for example, a quantity of RBs) actually assigned to the scheduled at least two carriers, cells, or bandwidth parts and a minimum or maximum quantity of frequency domain resources that can be assigned to the scheduled at least two carriers, cells, or bandwidth parts.

It can be understood that the indication method of the information bit described in (1) to (4) is also the method in which the effective frequency domain resource assignment of a plurality of carriers, cells, or bandwidth parts is jointly encoded to determine the frequency domain resource assignment field.

In some implementations, a number of the frequency domain resource is an independent number of a frequency domain resource of each scheduled carrier, cell, or bandwidth part, for example, RB numbers of the carrier 1 are 0-5, and RB numbers of the carrier 2 are 0-6; or an number of the frequency domain resource is a joint number of frequency domain resources of all scheduled carriers, cells, or bandwidth parts, for example, RB numbers of the carrier 1 are 0-5, and RB numbers of the carrier 2 are 6-11.

The following is an example of the DCI scheduling two carriers, cells, or BWPs, and the frequency domain resources are RBs. The size of the frequency domain resource assignment field of the DCI may include: Solution a and Solution b.

Solution a:

$$\left\lceil \log_2\left(\frac{N_{RB}^1 N_{RB}^2 (N_{RB}^1+1)(N_{RB}^2+1)}{4}\right)\right\rceil$$

In Solution a, each information bit in the frequency domain resource assignment field is corresponding to a combination of RB assignment on the carrier 1 and RB assignment on the carrier 2.

For example, each information bit indicates a combination {S1, D1, S2, D2}, where S1 is a start RB index of a resource assigned to the carrier 1, the cell 1, or the BWP 1, and D1 is a quantity of RBs of the resource assigned to the carrier 1, the cell 1, or the BWP 1; S2 is a start RB index of a resource assigned to the carrier 2, the cell 2, or the BWP 2, and D2 is a quantity of RBs of the resource assigned to the carrier 2, the cell 2, or the BWP 2.

Alternatively, each information bit indicates a combination {S1, E1, S2, E2}, where S1 is a start RB of the resource assigned to the carrier 1, the cell 1, or the BWP 1, and E1 is an end RB of the resource assigned to the carrier 1, the cell 1, or the BWP 1; S2 is a start RB of the resource assigned to the carrier 2, the cell 2, or the BWP 2, and E2 is an end RB of the resource assigned to the carrier 2, the cell 2, or the BWP 2.

It can be understood that the number of the RB mentioned above may be an independent number of the RBs of each scheduled carrier, cell, or BWP, or a joint number of the RBs of all scheduled carriers, cells, or BWPs.

Compared with the independent coding of the frequency domain resources assigned to each carrier, cell, or BWP, Solution a has less overhead, and the overhead of the DCI can be reduced.

Solution b:

$$\left\lceil \log_2\left(\frac{(N_{RB}^1(N_{RB}^1+1)+1)(N_{RB}^2(N_{RB}^2+1)+1)}{4}\right)\right\rceil$$

In Solution b, each information bit is corresponding to a combination of resource assignment on the carrier 1, the cell 1, or the BWP 1 and resource assignment on the carrier 2, the cell 2, or the BWP 2, which is similar to that in Solution a.

It can be understood that resource assignment on any carrier, cell, or BWP may be invalid assignment, for example, a quantity of RBs actually indicated on or assigned to a carrier, cell, or BWP is not a quantity of valid RBs of the carrier, cell, or BWP (for example, 0 RB or greater than a maximum quantity of available RBs), or an indicated start RB or end RB is not a valid RB. Invalid assignment is used to indicate that no data is scheduled on this carrier, cell, or BWP, or a special scheduling behavior such as activating or deactivating semi-static resource assignment/configured grant, or activating/deactivating dormancy, or triggering a physical random access channel (PRACH). Compared with Solution a, this method may support a case of indicating or scheduling data of only one carrier, cell, or BWP, and the overhead of the DCI is still smaller than the overhead of independent coding of the frequency domain resource assigned to each carrier, cell, or BWP.

In Solution a and Solution b, in some embodiments, $N_{RB}^1$ and $N_{RB}^2$ are the quantity $K_1$ and $K_2$ of RBs of the carrier 1 and the carrier 2, respectively.

Alternatively, in other implementations, for the BWPs of the carrier 1 and the carrier 2, if a minimum (or maximum) quantity $L_1$ and $L_2$ of RBs that can be scheduled for each BWP is pre-defined or configured by the network, then $N_{RB}^1=K_1-L_1+1$, $N_{RB}^2=K_2-L_2+1$, where $K_1$ is the quantity of RBs of the carrier 1, and $K_2$ is the quantity of RBs of the carrier 2.

In this case, each information bit may indicate a combination {S1, D1, S2, D2}, where Si is a start RB index of the resource assigned to the i-th scheduled carrier, cell, or BWP, Di is a quantity of RBs of the resource actually assigned to the i-th scheduled carrier, cell, or BWP, or a quantity ($L_i$) of RBs actually assigned to the i-th scheduled carrier, cell, or BWP, where $L_i$ is a minimum (or maximum) quantity of RBs that can be scheduled in the i-th scheduled carrier, cell, or BWP, where i=1 or 2.

Alternatively, each information bit may indicate a combination {S1, E1, S2, E2}, where S1 is a start RB of the resource assigned to the carrier 1, the cell 1, or the BWP 1, and E1 is an end RB of the resource assigned to the carrier 1, the cell 1, or the BWP 1; S2 is a start RB of the resource assigned to the carrier 2, the cell 2, or the BWP 2, and E2 is an end RB of the resource assigned to the carrier 2, the cell 2, or the BWP 2.

The number of the RB may be an independent number of each carrier, cell, or BWP, for example, RB numbers of the carrier 1 are 1-5, and RB numbers of the carrier 2 are 1-6, or may be a joint number of RBs of all scheduled carriers, cells, or BWPs, for example, RB numbers of the carrier 1 are 1-5, and RB numbers of the carrier 2 are 6-11.

For example, the quantity $K_1$ of RBs of the carrier 1 is 50 RBs, and the minimum quantity $L_1$ of RBs that can be scheduled and configured by the network is 10, then the quantity of RBs of data that can be scheduled is: 10, 11, 12, ..., 49, 50.

It can be understood that, the DCI overhead can be reduced by using the foregoing indication method of the information bit. When the amount of data to be scheduled is less than the minimum quantity of RBs, the single-cell scheduling DCI may be selected.

Method 2: when the DCI is used to schedule one or more carriers, cells, or BWPs, Solution c or Solution d is used to limit the frequency domain scheduling to reduce the assignment overhead of the Type 1 frequency domain resource.
Solution c.

In Solution c, the frequency domain resource assignment field includes: an index corresponding to one or more resource indication values (RIV), or referred to as MV code points. For example, the terminal can determine the frequency domain resource assigned to the carrier, cell, or bandwidth part based on an index table in the frequency domain resource assignment field. Since a quantity of bits occupied by the index is less than a quantity of bits occupied by the RIV, the assignment overhead of the Type 1 frequency domain resource is reduced.

It can be understood that, in some implementations of Solution c, before step 202, the terminal receives a resource indication value list configured by a network device for each scheduled carrier, cell, or bandwidth part, where the index indicates a position of a resource indication value in the resource indication value list.

For example, the terminal receives the foregoing correspondence configured by the network device through radio resource control (RRC) signaling. In this way, the network device indicates the frequency domain resource by using the index corresponding to the resource indication value. In other words, the network device may configure the MV list corresponding to the required MV code point through RRC (for the form of the RIV list, please refer to Table 2 in Embodiment 2 introduced below), and the DCI is used to indicate the frequency domain resource by using the index corresponding to the RIV code point. A correspondence between the RIV code point and the index of each scheduled carrier, cell, or bandwidth part is recorded in the foregoing RIV list. It can be understood that the index may be implicitly included. An RIV list is configured, and a position of the RIV code point in the RIV list is the index.

In some implementations, a size of the frequency domain resource assignment field is related to a quantity of resource indication values in a resource indication value list of each scheduled carrier, cell, or bandwidth part.

In other words, if an RIV list is separately configured for one or more scheduled carriers, cells, or BWPs through RRC, the size of the frequency domain resource assignment field required for each scheduled carrier, cell, or BWP in scheduling is calculated based on a quantity of MV code points in each configured MV list.

It can be understood that, in other implementations of Solution c, before step 202, a resource indication value list jointly configured by a network device for the plurality of carriers, cells, or bandwidth parts is received, where the index indicates a position of a resource indication value in the jointly configured resource indication value list.

In other words, the network device may configure an MV list jointly configured by the plurality of carriers, cells, or bandwidth parts through RRC, and the DCI is used to indicate the frequency domain resource by using the index corresponding to the MV code point in the jointly configured MV list. A correspondence between RIV code points and indexes of the plurality of carriers, cells, or bandwidth parts is recorded in the foregoing jointly configured MV list.

In some implementations, a size of the frequency domain resource assignment field is related to a quantity of resource indication values in a jointly configured resource indication value list.

In other words, if an MV list is jointly configured for the plurality of scheduled carriers, cells, or BWPs through RRC, the size of the frequency domain resource assignment field required for the DCI to schedule the plurality of carriers, cells, or BWPs is calculated based on a quantity of MV code points in the jointly configured RIV list.
Solution d.

In Solution d, the frequency domain resource assignment field includes: indexes corresponding to frequency domain resource sets, and the frequency domain resource sets satisfy a preset condition. In other words, the frequency domain resource assignment field only indicates an assignment status of a frequency domain resource set that satisfies the preset condition.

For example, the scheduled RBs are restricted to satisfy the preset condition, and a quantity of FDRA bits required for the carrier, cell, or BWP is calculated based on a quantity of RB sets of RBs that satisfy the preset condition.

The frequency domain RB sets that satisfy the preset condition are sorted in a specific order, and sorted indexes are used for indication in the DCI.

For example, the preset condition may include one or more of following:
 (1) a quantity of frequency domain resources in the frequency domain resource set is greater than or equal to a first preset value, and for example, the first preset value may be predefined or configured by RRC;

(2) a ratio of the quantity of frequency domain resources in the frequency domain resource set to a quantity of frequency domain resources that can be assigned to the scheduled carriers, cells, or bandwidth parts is greater than or equal to a second preset value, and for example, the second preset value may be predefined or configured by RRC, such as 50%.

Optionally, the indexes indicate that the frequency domain resource sets are arranged in an ascending or a descending order based on corresponding resource indication values.

In the embodiments of the present disclosure, the frequency domain resource assignment of the plurality of carriers, cells, or BWPs are jointly coded, and/or candidates for the frequency domain resource assignment are reasonably limited. In this way, in a scenario where one piece of DCI is used to schedule a plurality of carriers, cells, or BWPs, while maintaining the same scheduling flexibility, the resource overhead of the control channel can be reduced, and the demodulation performance of the control channel and the effective coverage of the system can be improved.

Figure 3:
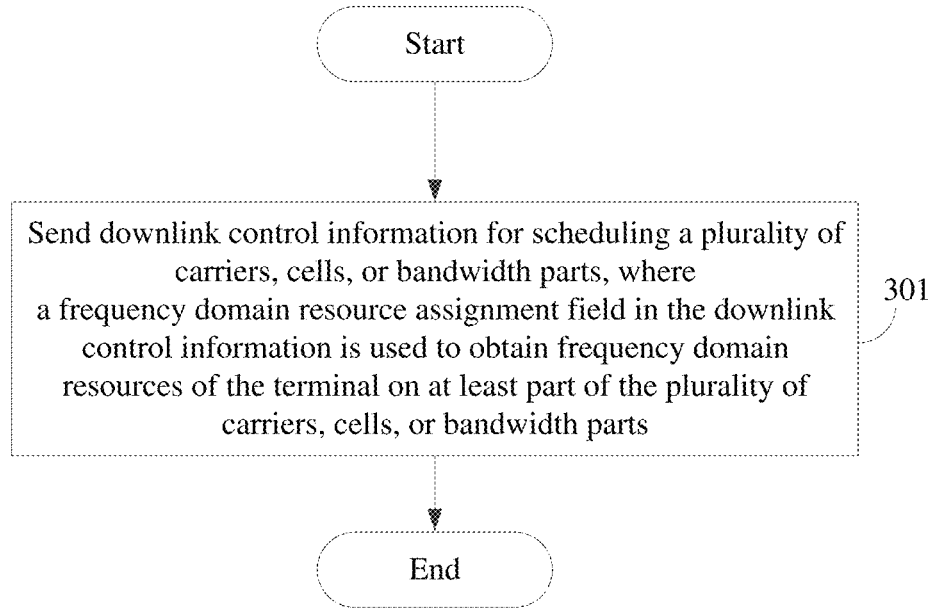
FIG. 3 is a flowchart 2 of a frequency domain resource assignment method according to an embodiment of the present disclosure.

Referring to FIG. 3, an embodiment of the present disclosure further provides a frequency domain resource assignment method. The method may be performed by a network device and includes step 301.

Step 301: send downlink control information for scheduling a plurality of carriers, cells, or bandwidth parts.

A frequency domain resource assignment field in the downlink control information is used to obtain frequency domain resources of the terminal on at least part of the plurality of carriers, cells, or bandwidth parts.

In some implementations, before or after step 301, the network device sends (for example, sends through RRC signaling) a resource indication value list jointly configured for the plurality of carriers, cells, or bandwidth parts, where the index indicates a position of a resource indication value in the jointly configured resource indication value list, or a resource indication value list configured for each scheduled carrier, cell, or bandwidth part, where the index indicates a position of a resource indication value in the resource indication value list.

It should be noted that, for the description of the frequency domain resource assignment field in the embodiment shown in FIG. 3, reference may be made to the description in the embodiment shown in FIG. 2, and details are not described herein again.

In the embodiments of the present disclosure, the frequency domain resource assignment of the plurality of carriers, cells, or BWPs are jointly coded, and/or candidates for the frequency domain resource assignment are reasonably limited. In this way, in a scenario where one piece of DCI is used to schedule a plurality of carriers, cells, or BWPs, while maintaining the same scheduling flexibility, the resource overhead of the control channel can be reduced, and the demodulation performance of the control channel and the effective coverage of the system can be improved.

Implementations of the present disclosure will be described below with reference to Embodiment 1, Embodiment 2, and Embodiment 3.

Embodiment 1

It is assumed that the terminal is configured with two cells, the active BWP of each cell is 50 RBs, and two cells are jointly scheduled by using one piece of DCI.

If each cell is coded separately by using the Type 1, a size of the frequency domain resource assignment field of the joint scheduling DCI is 22 bits.

If Method 1 is used to reduce the assignment overhead of the Type 1 frequency domain resource through joint coding of a plurality of carriers, cells, or bandwidth parts.

According to the formula $$\left\lceil \log_2\left(\frac{N_{RB}^1 N_{RB}^2 (N_{RB}^1 + 1)(N_{RB}^2 + 1)}{4}\right)\right\rceil,$$

the size of the jointly coded frequency domain resource assignment field is calculated as $$\left\lceil \log_2\left(\frac{50 \times 50(50+1)(50+1)}{4}\right)\right\rceil = 21 \text{ bits},$$

which is 1 bit less than the 22 bits of the frequency domain resource assignment field of the separately coded joint scheduling DCI.

It should be noted that the BWP of each cell is 50 RBs. If the data that is less than 50 RBs is scheduled in total, it is entirely possible to transmit the scheduled data in any cell.

Therefore, when the network configures the joint scheduling DCI, a minimum quantity of RBs scheduled by each cell may be 25.

In this case, the calculation is performed according to the formulas $$N_{RB}^1 = K_1 - L_1 + 1 \text{ and } \left\lceil \log_2\left(\frac{N_{RB}^1 N_{RB}^2 (N_{RB}^1 + 1)(N_{RB}^2 + 1)}{4}\right)\right\rceil,$$

where $K_1=50$, $L_1=25$. The size of the jointly coded frequency domain resource assignment field is calculated as 17 bits, which is 5 bits less than the 22 bits of the frequency domain resource assignment field of the separately coded joint scheduling DCI.

Embodiment 2

RRC is used to configure the RIV list corresponding to the RIV code point, and the DCI is used to indicate the frequency domain resources of a plurality of carriers, cells, or active BWPs by using the index corresponding to the RIV code point. For example, when two carriers, cells, or active BWPs are scheduled, the quantity of RBs for each carrier, cell, or active BWP is 10, there are 45 resource assignment points for continuous RB assignment, and 6 bits are required for the MV value of the Type 1 frequency domain resource assignment (which represents R consecutive RB resource indications), where some RIV values represent invalid resource assignments. Examples of the RIV list configured through RRC are as follows:

TABLE 2

| Index | RIV value for CC1 | RIV value for CC2 |
|-------|-------------------|-------------------|
| 0 | 001100 | 001001 |
| 1 | 001001 | 001010 |
| 2 | 001011 | 010011 |
| 3 | 010011 | 001111 |

In this case, the size of the frequency domain resource assignment field for the DCI scheduling CC1 and CC2 is 2 bits.

Optionally, the MV list that is configured through RRC may also be configured for CC1 and CC2 separately (for example, the CC1 table includes 4 MV code points (corresponding indexes are 0-3), and the CC2 table includes 8 MV code points (corresponding indexes are 0-7)), the size of the frequency domain resource assignment field of CC1 of joint DCI scheduling is 2 bits, and the size of the frequency domain resource assignment field of CC2 is 3 bits.

Embodiment 3

The RBs that are restricted in scheduling should be more than half of the total quantity of BWP RBs. Type 1 FDRA values that satisfy this condition are sorted and indicated based on the sorted indexes. For example, if a quantity of RBs for a BWP is 4, there are 3 cases for the RIV value of the Type 1 FDRA that satisfies the condition: 0111, 1010, and 1011, which need to be indicated by 2 bits. For example, the RIV value of the FDRA represented by 0000 is 0111.

Figure 4:
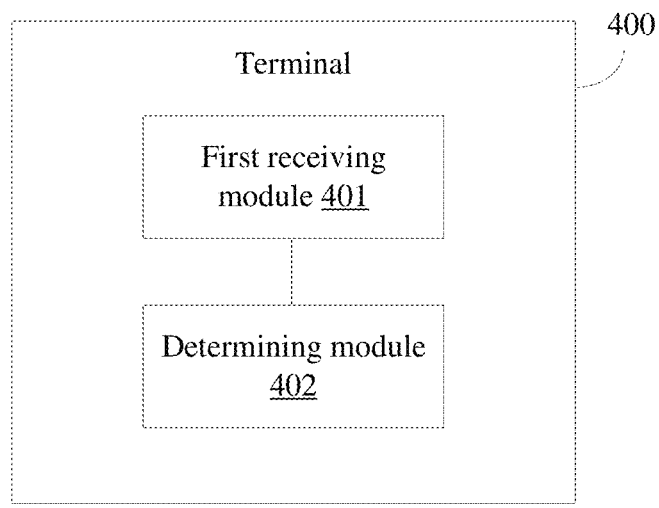
FIG. 4 is a schematic diagram of a terminal according to an embodiment of the present disclosure.

Referring to FIG. 4, an embodiment of the present disclosure further provides a terminal. The terminal 400 includes:

a first receiving module 401, configured to receive downlink control information for scheduling a plurality of carriers, cells, or bandwidth parts; and a determining module 402, configured to determine, based on a frequency domain resource assignment field in the downlink control information, frequency domain resources of the terminal on at least part of the plurality of carriers, cells, or bandwidth parts.

In some implementations, the frequency domain resource assignment field is determined based on joint coding of frequency domain resources assigned to the plurality of carriers, cells, or bandwidth parts.

In some implementations, one information bit in the frequency domain resource assignment field indicates frequency domain resources assigned to at least two scheduled carriers, cells, or bandwidth parts.

In some implementations, a size of the frequency domain resource assignment field is related to $N_i$ and T, where T represents a quantity of scheduled carriers, cells, or bandwidth parts, and T is a positive integer; and $N_i$ represents a quantity of frequency domain resources of an i-th scheduled carrier, cell, or bandwidth part, or $N_i = K_i - L_i + 1$, $K_i$ is a quantity of frequency domain resources of an i-th scheduled carrier, cell, or bandwidth part, and $L_i$ is a minimum or maximum quantity of frequency domain resources that can be assigned to the i-th scheduled carrier, cell, or bandwidth part, where i=0, 1, ..., T−1.

In some implementations, a size of the frequency domain resource assignment field is $$\left\lceil \log_2\left(\frac{\prod_{i=0}^{T-1}\{N_i(N_i+1)\}}{2^T}\right) \right\rceil$$

or $\left\lceil \log_2\left(\frac{\prod_{i=0}^{T-1}\{N_i(N_i+1)+1\}}{2^T}\right) \right\rceil$.

In some implementations, the information bit indicates:

(1) a start frequency domain resource (for example, a start RB index) and a quantity (for example, a quantity of RBs) of frequency domain resources (for example, the RBs) assigned to the scheduled at least two carriers, cells, or bandwidth parts;

(2) a start frequency domain resource (for example, a start RB index) and an end frequency domain resource (for example, an end RB index) of frequency domain resources (for example, the RBs) assigned to the scheduled at least two carriers, cells, or bandwidth parts;

(3) a start frequency domain resource (for example, a start RB index) of frequency domain resources (for example, the RBs) assigned to the scheduled at least two carriers, cells, or bandwidth parts and a quantity of frequency domain resources (for example, a quantity of RBs) actually assigned to the scheduled at least two carriers, cells, or bandwidth parts;

(4) a start frequency domain resource (for example, a start RB index) of frequency domain resources (for example, the RBs) assigned to the scheduled at least two carriers, cells, or bandwidth parts, and a difference between a quantity of frequency domain resources (for example, a quantity of RBs) actually assigned to the scheduled at least two carriers, cells, or bandwidth parts and a minimum or maximum quantity of frequency domain resources that can be assigned to the scheduled at least two carriers, cells, or bandwidth parts.

In some implementations, a number of the frequency domain resource is an independent number of a frequency domain resource of each scheduled carrier, cell, or bandwidth part; or a number of the frequency domain resource is a joint number of frequency domain resources of all scheduled carriers, cells, or bandwidth parts.

In some implementations, the frequency domain resource assignment field includes: an index corresponding to one or more resource indication values.

In some implementations, the terminal 400 includes:

a second receiving module, configured to receive a resource indication value list configured by a network device for each scheduled carrier, cell, or bandwidth part, where the index indicates a position of a resource indication value in the resource indication value list.

In some implementations, a size of the frequency domain resource assignment field is related to a quantity of resource indication values in a resource indication value list of each scheduled carrier, cell, or bandwidth part.

In some implementations, the terminal 400 includes:

a third receiving module, configured to receive a resource indication value list jointly configured by a network device for the plurality of carriers, cells, or bandwidth parts, where the index indicates a position of a resource indication value in the resource indication value list.

In some implementations, a size of the frequency domain resource assignment field is related to a quantity of resource indication values in a jointly configured resource indication value list.

In some implementations, the frequency domain resource assignment field includes: indexes corresponding to frequency domain resource sets, and a frequency domain resource in the frequency domain resource sets satisfies a preset condition.

In some implementations, the preset condition includes one or more of following:

a quantity of frequency domain resources in the frequency domain resource set is greater than or equal to a first preset value; and a ratio of the quantity of frequency domain resources in the frequency domain resource set to a quantity of frequency domain resources that can be assigned to the scheduled carriers, cells, or bandwidth parts is greater than or equal to a second preset value.

In some implementations, a size of the frequency domain resource assignment field is related to the quantity of the frequency domain resource sets.

In some implementations, the indexes indicate that the frequency domain resource sets are arranged in an ascending or a descending order based on corresponding resource indication values.

The terminal according to this embodiment of the present disclosure may perform the foregoing method embodiment shown in FIG. 2. An implementation principle and a technical effect of the terminal are similar to those of the method embodiment, and details are not described again in this embodiment.

Figure 5:
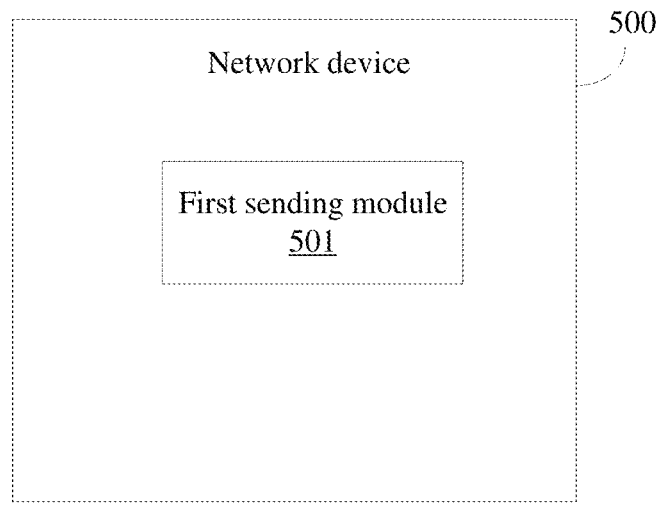
FIG. 5 is a schematic diagram of a network device according to an embodiment of the present disclosure.

Referring to FIG. 5, an embodiment of the present disclosure further provides a network device. The network device 500 includes:

a first sending module 501, configured to send downlink control information for scheduling a plurality of carriers, cells, or bandwidth parts, where a frequency domain resource assignment field in the downlink control information is used to obtain frequency domain resources of the terminal on at least part of the plurality of carriers, cells, or bandwidth parts.

In some implementations, the frequency domain resource assignment field is determined based on assignment joint coding of frequency domain resources assigned to the plurality of carriers, cells, or bandwidth parts.

In some implementations, one information bit in the frequency domain resource assignment field indicates the Type 1 frequency domain resources assigned to at least two scheduled carriers, cells, or bandwidth parts.

In some implementations, a size of the frequency domain resource assignment field is related to $N_i$ and T, where T represents a quantity of scheduled carriers, cells, or bandwidth parts, and T is a positive integer; and $N_i$ represents a quantity of frequency domain resources of an i-th scheduled carrier, cell, or bandwidth part, or $N_i = K_i - L_i + 1$, $K_i$ is a quantity of frequency domain resources of an i-th scheduled carrier, cell, or bandwidth part, and $L_i$ is a minimum or maximum quantity of frequency domain resources that can be assigned to the i-th scheduled carrier, cell, or bandwidth part, where i=0, 1, . . . , T−1.

In some implementations, a size of the frequency domain resource assignment field is:

$$\left\lceil \log_2\left(\frac{\prod_{i=0}^{T-1}\{N_i(N_i+1)\}}{2^T}\right) \right\rceil$$

$$\text{or } \left\lceil \log_2\left(\frac{\prod_{i=0}^{T-1}\{N_i(N_i+1)+1\}}{2^T}\right) \right\rceil.$$

In some implementations, the information bit indicates:

(1) a start frequency domain resource (for example, a start RB index) and a quantity (for example, a quantity of RBs) of frequency domain resources (for example, the RBs) assigned to the scheduled at least two carriers, cells, or bandwidth parts;

(2) a start frequency domain resource (for example, a start RB index) and an end frequency domain resource (for example, an end RB index) of frequency domain resources (for example, the RBs) assigned to the scheduled at least two carriers, cells, or bandwidth parts;

(3) a start frequency domain resource (for example, a start RB index) of frequency domain resources (for example, the RBs) assigned to the scheduled at least two carriers, cells, or bandwidth parts and a quantity of frequency domain resources (for example, a quantity of RBs) actually assigned to the scheduled at least two carriers, cells, or bandwidth parts;

(4) a start frequency domain resource (for example, a start RB index) of frequency domain resources (for example, the RBs) assigned to the scheduled at least two carriers, cells, or bandwidth parts, and a difference between a quantity of frequency domain resources (for example, a quantity of RBs) actually assigned to the scheduled at least two carriers, cells, or bandwidth parts and a minimum or maximum quantity of frequency domain resources that can be assigned to the scheduled at least two carriers, cells, or bandwidth parts.

In some implementations, a number of the frequency domain resource is an independent number of a frequency domain resource of each scheduled carrier, cell, or bandwidth part;

or the number of the frequency domain resource is a joint number of frequency domain resources of all scheduled carriers, cells, or bandwidth parts.

In some implementations, the frequency domain resource assignment field includes: an index corresponding to one or more resource indication values.

In some implementations, the frequency domain resource assignment field includes:

indexes corresponding to frequency domain resource sets, and a frequency domain resource in the frequency domain resource sets satisfies a preset condition.

In some implementations, the indexes indicate that the frequency domain resource sets are arranged in an ascending or a descending order based on corresponding resource indication values.

In some implementations, the network device 500 further includes: a second sending module, configured to send (for example, send through RRC signaling) a resource indication value list jointly configured for the plurality of carriers, cells, or bandwidth parts, where the index indicates a position of a resource indication value in the jointly configured resource indication value list, or a resource indication value list configured for each carrier, cell, or bandwidth part, where the index indicates a position of a resource indication value in the resource indication value list.

The network device provided in this embodiment of the present disclosure may perform the foregoing method embodiment shown in FIG. 3. An implementation principle and a technical effect are similar to those in the method embodiment. Details are not described again in this embodiment.

Figure 6:
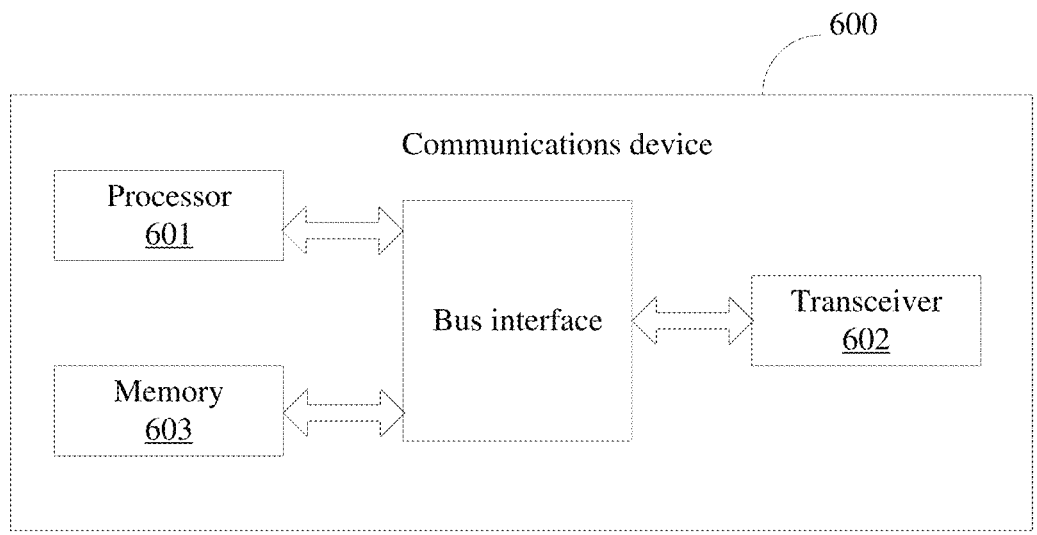
FIG. 6 is a schematic diagram of a communications device according to an embodiment of the present disclosure.

Referring to FIG. 6, FIG. 6 is a structural diagram of a communications device to which an embodiment of the present disclosure is applied. As shown in FIG. 6, the communications device 600 includes: a processor 601, a transceiver 602, a memory 603, and a bus interface.

In an embodiment of the present disclosure, the communications device 600 further includes a program stored in the memory 603 and executable on the processor 601. When the program is executed by the processor 601, steps in the embodiments shown in FIG. 2 or FIG. 3 are implemented.

In FIG. 6, a bus architecture may include any quantity of interconnected buses and bridges, and is linked by various circuits of one or more processors represented by the processor 601 and a memory represented by the memory 603. The bus architecture may further link various other circuits such as a peripheral device, a voltage regulator, and a power management circuit together. These are all well-known in the art, and therefore are not described in this specification. The bus interface provides interfaces. The transceiver 602 may include a plurality of elements, that is, include a transmitter and a receiver, and provide units for communication with various other apparatuses on a transmission medium. It can be understood that the transceiver 602 is an optional component.

The processor 601 is responsible for managing the bus architecture and common processing, and the memory 603 may store data used when the processor 601 performs an operation.

The communications device provided in this embodiment of the present disclosure may execute the foregoing method embodiment shown in FIG. 2 or FIG. 3, and implementation principles and technical effects thereof are similar, and details are not described herein again in this embodiment.

An embodiment of the present disclosure still provides a chip, where the chip includes a processor and a communications interface, the communications interface is coupled to the processor, and the processor is configured to run a program or an instruction to implement the processes of the method embodiments as shown in FIG. 2 or FIG. 3, and a same technical effect can be achieved. To avoid repetition, details are not described herein again.

It should be understood that the chip mentioned in this embodiment of the present disclosure may also be referred to as a system-level chip, a system chip, a chip system, or an on-chip system chip.

The method or algorithm steps described in combination with content disclosed in the present disclosure may be implemented by hardware, or may be implemented by a processor by executing software instructions. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a read-only optical disc, or any other form of non-transitory storage medium familiar in the art. An exemplary non-transitory storage medium is coupled to the processor, so that the processor can read information from the non-transitory storage medium and can write information to the non-transitory storage medium. Certainly, the non-transitory storage medium may also be a component of the processor. The processor and the non-transitory storage medium may be located in an application specific integrated circuit (ASIC). In addition, the ASIC may be located in a core network interface device. Certainly, the processor and the non-transitory storage medium may exist in the core network interface device as discrete components.

A person skilled in the art should be aware that in the foregoing one or more examples, functions described in the present disclosure may be implemented by hardware, software, firmware, or any combination thereof. When implemented by software, the foregoing functions may be stored in a readable medium or transmitted as one or more instructions or code in the readable medium. The readable medium includes a non-transitory computer storage medium and a communications medium, where the communications medium includes any medium that enables a computer program to be transmitted from one place to another. The non-transitory storage medium may be any usable medium accessible to a general-purpose or dedicated computer.

The objectives, technical solutions, and beneficial effects of the present disclosure are described in detail in the foregoing description of embodiments. It should be understood that the foregoing descriptions are merely description of embodiments of the present disclosure, and are not intended to limit the protection scope of the present disclosure. Any modification, equivalent replacement, improvement, or the like made on the basis of the technical solutions of the present disclosure shall fall within the protection scope of the present disclosure.

A person skilled in the art should understand that the embodiments of the present disclosure can be provided as a method, a system, or a computer program product. Therefore, the embodiments of the present disclosure may be embodiments in a form of a complete hardware embodiment, a complete software embodiment, or an embodiment incorporating software and hardware aspects. Moreover, the embodiments of the present disclosure may use a form of a computer program product that is implemented on one or more computer-usable storage media (including but not limited to a magnetic disk memory, a CD-ROM, an optical memory, and the like) that include a computer-usable program code.

The embodiments of the present disclosure are described with reference to the flowcharts and/or block diagrams of the methods, devices (systems), and computer program products according to the embodiments of the present disclosure. It should be understood that each process and/or block in the flowchart and/or block diagram as well as a combination of processes and/or blocks in the flowchart and/or block diagram may be implemented by computer program instructions. These computer program instructions can be provided to a general-purpose computer, a special-purpose computer, an embedded processor, or a processor of another programmable data processing device to generate a machine, so that an apparatus configured to implement functions specified in one or more procedures of a flowchart and/or one or more blocks of a block diagram is generated by using the instructions executed by the computer or the processor of another programmable data processing device.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a function specified in one or more procedures of the flowchart and/or in one or more blocks of the block diagram.

These computer program instructions may also be loaded onto a computer or another programmable data processing device, so that a series of operation steps are performed on the computer or another programmable device to produce computer-implemented processing, thereby providing instructions executed on the computer or another programmable device to implement steps for the function specified in one or more processes of the flowchart and/or one or more blocks of the block diagram.

Obviously, a person skilled in the art can make various modifications and variations to the embodiments of the present disclosure without departing from the spirit and scope of the present disclosure. In this way, the present disclosure is intended to include these modifications and variations to the embodiments of the present disclosure provided that these modifications and variations fall within the scope of the claims of the present disclosure and their equivalent technologies.

What is claimed is:

1. A frequency domain resource assignment method, performed by a terminal and comprising:
   receiving downlink control information for scheduling a plurality of carriers, cells, or bandwidth parts; and
   determining, based on a frequency domain resource assignment field in the downlink control information, frequency domain resources of the terminal on at least part of the plurality of carriers, cells, or bandwidth parts;
   wherein one information bit in the frequency domain resource assignment field indicates frequency domain resources assigned to at least two scheduled carriers, cells, or bandwidth parts.

2. The method according to claim 1, wherein the frequency domain resource assignment field is determined based on joint coding of frequency domain resources assigned to the plurality of carriers, cells, or bandwidth parts.

3. The method according to claim 1, wherein a size of the frequency domain resource assignment field is related to $N_i$ and T, wherein
   T represents a quantity of scheduled carriers, cells, or bandwidth parts, and T is a positive integer; and
   $N_i$ represents a quantity of frequency domain resources of an i-th scheduled carrier, cell, or bandwidth part, or
   $N_i=K_i-L_i+1$, $K_i$ is a quantity of frequency domain resources of an i-th scheduled carrier, cell, or bandwidth part, and $L_i$ is a minimum or maximum quantity of frequency domain resources that can be assigned to the i-th scheduled carrier, cell, or bandwidth part, wherein i=0, 1, . . . , T−1.

4. The method according to claim 3, wherein a size of the frequency domain resource assignment field is:

$$\left\lceil \log_2 \left( \frac{\prod_{i=0}^{T-1} \{N_i(N_i+1)\}}{2^T} \right) \right\rceil$$

or $\left\lceil \log_2 \left( \frac{\prod_{i=0}^{T-1} \{N_i(N_i+1)+1\}}{2^T} \right) \right\rceil$.

5. The method according to claim 1, wherein the information bit indicates:
   a start frequency domain resource and a quantity of frequency domain resources assigned to the scheduled at least two carriers, cells, or bandwidth parts;
   or
   a start frequency domain resource and an end frequency domain resource of frequency domain resources assigned to the scheduled at least two carriers, cells, or bandwidth parts;
   or
   a start frequency domain resource of frequency domain resources assigned to the scheduled at least two carriers, cells, or bandwidth parts and a quantity of frequency domain resources actually assigned to the scheduled at least two carriers, cells, or bandwidth parts;
   or
   a start frequency domain resource of frequency domain resources assigned to the scheduled at least two carriers, cells, or bandwidth parts, and a difference between a quantity of frequency domain resources actually assigned to the scheduled at least two carriers, cells, or bandwidth parts and a minimum or maximum quantity of frequency domain resources that can be assigned to the scheduled at least two carriers, cells, or bandwidth parts.

6. The method according to claim 5, wherein a number of the frequency domain resource is an independent number of a frequency domain resource of each scheduled carrier, cell, or bandwidth part;
   or
   the number of the frequency domain resource is a joint number of frequency domain resources of all scheduled carriers, cells, or bandwidth parts.

7. The method according to claim 1, wherein the frequency domain resource assignment field comprises: an index corresponding to one or more resource indication values.

8. The method according to claim 7, further comprising:
   receiving a resource indication value list configured by a network device for each scheduled carrier, cell, or bandwidth part, wherein the index indicates a position of a resource indication value in the resource indication value list.

9. The method according to claim 8, wherein a size of the frequency domain resource assignment field is related to a quantity of resource indication values in a resource indication value list of each scheduled carrier, cell, or bandwidth part.

10. The method according to claim 7, further comprising:
    receiving a resource indication value list jointly configured by a network device for the plurality of carriers, cells, or bandwidth parts, wherein the index indicates a position of a resource indication value in the resource indication value list.

11. The method according to claim 10, wherein a size of the frequency domain resource assignment field is related to a quantity of resource indication values in a jointly configured resource indication value list.

12. The method according to claim 1, wherein the frequency domain resource assignment field comprises: indexes corresponding to frequency domain resource sets, and the frequency domain resource sets satisfy a preset condition.

13. The method according to claim 12, wherein the preset condition comprises one or more of following:
    a quantity of frequency domain resources in the frequency domain resource set is greater than or equal to a first preset value; and
    a ratio of the quantity of frequency domain resources in the frequency domain resource set to a quantity of frequency domain resources that can be assigned to the scheduled carriers, cells, or bandwidth parts is greater than or equal to a second preset value; and/or
    a size of the frequency domain resource assignment field is related to the quantity of the frequency domain resource sets; and/or
    the indexes indicate that the frequency domain resource sets are arranged in an ascending or a descending order based on corresponding resource indication values.

14. A frequency domain resource assignment method, performed by a network device and comprising:

sending downlink control information for scheduling a plurality of carriers, cells, or bandwidth parts, wherein a frequency domain resource assignment field in the downlink control information is used to obtain frequency domain resources of the network device on at least part of the plurality of carriers, cells, or bandwidth parts;

wherein one information bit in the frequency domain resource assignment field indicates frequency domain resources assigned to at least two scheduled carriers, cells, or bandwidth parts.

15. The method according to claim 14, wherein the frequency domain resource assignment field is determined based on assignment joint coding of frequency domain resources assigned to the plurality of carriers, cells, or bandwidth parts.

16. The method according to claim 14, wherein the frequency domain resource assignment field comprises: an index corresponding to one or more resource indication values; or the frequency domain resource assignment field comprises: indexes corresponding to frequency domain resource sets, and a frequency domain resource in the frequency domain resource sets satisfies a preset condition.

17. A communications device, comprising a processor, a memory, and a program stored in the memory and executable on the processor, wherein when the program is executed by the processor, steps of the method according to claim 14 are implemented.

18. A communications device, comprising a processor, a memory, and a program stored in the memory and executable on the processor, wherein the program, when executed by the processor, causes the communications device to perform:

receiving downlink control information for scheduling a plurality of carriers, cells, or bandwidth parts; and determining, based on a frequency domain resource assignment field in the downlink control information, frequency domain resources of the communications device on at least part of the plurality of carriers, cells, or bandwidth parts;

wherein one information bit in the frequency domain resource assignment field indicates frequency domain resources assigned to at least two scheduled carriers, cells, or bandwidth parts.

* * * * *